United States Patent
Zabel et al.

(10) Patent No.: US 10,648,857 B2
(45) Date of Patent: May 12, 2020

(54) ULTRAVIOLET FLAME SENSOR WITH PROGRAMMABLE SENSITIVITY OFFSET

(71) Applicant: Honeywell International Inc., Morris Plains, NJ (US)

(72) Inventors: Brian Zabel, Yorktown, IN (US); Chad Carty, Nobelsville, IN (US); Aaron Daniels, Greenfield, IN (US)

(73) Assignee: Honeywell International Inc., Morris Plains, NJ (US)

( * ) Notice: Subject to any disclaimer, the term of this patent is extended or adjusted under 35 U.S.C. 154(b) by 88 days.

(21) Appl. No.: 15/950,034

(22) Filed: Apr. 10, 2018

(65) Prior Publication Data

US 2019/0310131 A1    Oct. 10, 2019

(51) Int. Cl.
  *G01J 1/42*    (2006.01)
  *G01K 3/10*    (2006.01)
  *G01J 1/44*    (2006.01)

(52) U.S. Cl.
  CPC .................. *G01J 1/429* (2013.01); *G01J 1/44* (2013.01); *G01K 3/10* (2013.01); *G01J 2001/444* (2013.01)

(58) Field of Classification Search
  CPC .......... G01J 1/429; F23N 5/082; F23N 5/242; F23N 2029/00; F23N 2031/10; F23N 2029/04; F23N 2029/12; F23N 2029/22
  See application file for complete search history.

(56) References Cited

U.S. PATENT DOCUMENTS

| | | |
|---|---|---|
| 3,683,372 A | 8/1972 | Horn |
| 4,202,318 A | 5/1980 | DePodesta et al. |
| 4,280,184 A | 7/1981 | Weiner et al. |
| 4,578,583 A | 3/1986 | Ciammaichella et al. |
| 4,823,114 A | 4/1989 | Gotisar |
| 4,882,573 A | 11/1989 | Leonard et al. |
| 5,123,836 A | 6/1992 | Yoneda et al. |
| 5,194,728 A | 3/1993 | Peterson |
| 5,256,057 A * | 10/1993 | Grow ...................... F23N 5/082 431/25 |
| 6,168,419 B1 | 1/2001 | Mindermann |

(Continued)

FOREIGN PATENT DOCUMENTS

| | | |
|---|---|---|
| JP | 2004037096 A | 2/2004 |
| JP | 2012255729 A | 12/2012 |

(Continued)

OTHER PUBLICATIONS

Kshitij Shinghal. Intelligent Multi Sensor System for Agricultural Fire Detection. MIT International Journal of Electronics and Communication Engineering. Jan. 2014, pp. 7-11, vol. 4, No. 1.

(Continued)

*Primary Examiner* — Kenneth J Malkowski

(57) ABSTRACT

A programmable controller for controlling an ultraviolet (UV) sensor may adjust an excitation voltage provided to the UV sensor based at least in part on a programmable sensitivity offset in order to produce an excitation voltage that results in a desired UV sensitivity for the UV sensor. The programmable sensitivity offset may be set for the UV sensor at the factory, set during commissioning of the UV sensor in the field, and/or automatically altered over time to help compensate for a degradation in sensitivity of the UV sensor.

15 Claims, 6 Drawing Sheets

(56) References Cited

U.S. PATENT DOCUMENTS

| | | |
|---|---|---|
| 6,261,086 B1 | 7/2001 | Fu |
| 6,404,342 B1 | 6/2002 | Planer et al. |
| 6,472,669 B1 | 10/2002 | Chase et al. |
| 6,515,283 B1 | 2/2003 | Castleman et al. |
| 7,088,253 B2 | 8/2006 | Grow |
| 7,244,946 B2 | 7/2007 | Burnette et al. |
| 7,468,515 B2 | 12/2008 | Cole et al. |
| 7,893,615 B2 | 2/2011 | Cole |
| 8,371,102 B1 | 2/2013 | Lee et al. |
| 8,516,895 B2 | 8/2013 | Verner et al. |
| 9,417,124 B1 | 8/2016 | Zabel et al. |
| 9,863,990 B2 | 1/2018 | Zabel et al. |
| 9,939,317 B1 * | 4/2018 | Mori ............... G01J 1/429 |
| 9,976,896 B2 | 5/2018 | Zabel et al. |
| 2003/0141979 A1 | 7/2003 | Wild et al. |
| 2003/0143503 A1 | 7/2003 | Wild et al. |
| 2005/0174244 A1 | 8/2005 | Grow |
| 2005/0247883 A1 * | 11/2005 | Burnette ............ G01J 1/429 250/372 |
| 2006/0049361 A1 | 3/2006 | Allsworth et al. |
| 2007/0019361 A1 | 1/2007 | Obrecht |
| 2009/0072737 A1 | 3/2009 | Cole |
| 2009/0120338 A1 | 5/2009 | Adendorff et al. |
| 2010/0013644 A1 | 1/2010 | McDonald et al. |
| 2012/0138809 A1 | 6/2012 | Mindermann et al. |
| 2016/0334271 A1 | 11/2016 | Zabel et al. |
| 2016/0334453 A1 | 11/2016 | Zabel et al. |
| 2016/0348906 A1 | 12/2016 | Mori |

FOREIGN PATENT DOCUMENTS

| | | |
|---|---|---|
| WO | 2010077307 A2 | 7/2010 |
| WO | 2016182732 A1 | 11/2016 |

OTHER PUBLICATIONS

Scot Lester. Flash-capacitor IC Powers Portable UV Flame Detector. EE Times. Jul. 21, 2006. 4 pages.

PCT/US2019/026424, Search Report and Written Opinion, pp. 6, dated Aug. 8, 2019.

* cited by examiner

ULTRAVIOLET FLAME SENSOR WITH PROGRAMMABLE SENSITIVITY OFFSET

TECHNICAL FIELD

The disclosure relates generally to ultraviolet (UV) sensors, and more particularly to UV sensors for use in combustion appliances.

BACKGROUND

Ultraviolet (UV) sensors are designed to detect the presence of UV radiation. For example, UV sensors may be utilized to detect the presence of radiation in the spectral range of approximately 10 nm to 400 nm.

UV sensors may be useful in many different product applications. For example, UV sensors may be useful in detecting the presence of a flame in a burner of a combustion appliance. Detecting the presence of a flame inside a burner can help safely operate the burner. For instance, if no flame is present in the burner, the burner may be shut down to help prevent unburned fuel from accumulating inside of the burner.

The absolute sensitivity of UV sensors may vary among a batch of new UV sensors. Also, absolute sensitivity of UV sensors tends to degrade over time, depending on usage, temperature and/or other environmental conditions, and other factors. As sensitivity degrades, it may be necessary to re-tune the combustion appliance, adjust safety parameters, and eventually replace the UV sensor, all of which may require a re-commissioning of the combustion appliance. What would be desirable is a technique to help compensate for variations in the sensitivity between UV sensors and/or variations in sensitivity over time.

SUMMARY

This disclosure relates generally to ultraviolet (UV) sensors, and more particularly to UV sensors for use in combustion appliances. In one example, a programmable controller for controlling an ultraviolet (UV) sensor may include an excitation voltage generator that is configured to produce an adjustable excitation voltage for use by the UV sensor. The UV sensor is excited by the excitation voltage, and the UV sensitivity of the UV sensor is highly dependent on the excitation voltage. The programmable controller may further include a programmable sensitivity offset circuit for use in controlling the UV sensitivity of the UV sensor. The programmable sensitivity offset circuit may provide a programmable sensitivity offset for the UV sensor. The programmable controller may include a control circuit operatively coupled to the excitation voltage generator and the programmable sensitivity offset circuit. The control circuit may be configured to control the excitation voltage generator based at least in part on the programmable sensitivity offset provided by the programmable sensitivity offset circuit to produce an excitation voltage that results in a desired UV sensitivity for the UV sensor.

Alternatively or additionally to the foregoing, the programmable sensitivity offset circuit may be configured to automatically change the programmable sensitivity offset over the lifetime of the UV sensor.

Alternatively or additionally to any of the embodiments above, the programmable sensitivity offset may be programmed at a time of original manufacturer of the UV sensor.

Alternatively or additionally to any of the embodiments above, the programmable sensitivity offset may be programmed at a time of commissioning of the UV sensor.

Alternatively or additionally to any of the embodiments above, the programmable sensitivity offset circuit may comprise a memory that stores the programmable sensitivity offset tailored to a particular UV sensor.

Alternatively or additionally to any of the embodiments above, the programmable controller may further comprise a timer for tracking an elapsed time, the memory stores a relationship between a programmable sensitivity offset variable and an elapsed time variable, and the programmable sensitivity offset circuit may be configured to reference the relationship stored in the memory with the elapsed time provided by the timer to identify the programmable sensitivity offset for use in controlling the excitation voltage produced by the excitation voltage generator.

Alternatively or additionally to any of the embodiments above, the programmable controller may further comprise a temperature sensor for tracking a temperature over time, the memory stores a relationship between the programmable sensitivity offset variable, the elapsed time variable and a temperature over time variable, and the programmable sensitivity offset circuit may be configured to reference the relationship stored in the memory with the elapsed time provided by the timer and the temperature provided by the temperature sensor to identify the programmable sensitivity offset for use in controlling the excitation voltage produced by the excitation voltage generator.

Alternatively or additionally to any of the embodiments above, the memory may store a multi-variable relationship between one or more condition variables and a programmable sensitivity offset variable, and the programmable sensitivity offset circuit may be configured to reference the multi-variable relationship stored in the memory with one or more of the condition variables to identify the programmable sensitivity offset for use in controlling the excitation voltage produced by the excitation voltage generator.

Alternatively or additionally to any of the embodiments above, the one or more condition variables may comprise an elapsed time variable.

Alternatively or additionally to any of the embodiments above, the one or more condition variables may comprise a temperature variable.

Alternatively or additionally to any of the embodiments above, the one or more condition variables may comprise an over-voltage variable.

Alternatively or additionally to any of the embodiments above, the one or more condition variables may comprise a cumulative number of conduction events of the UV sensor.

In another example, a programmable controller may include an excitation voltage generator configured to produce an adjustable excitation voltage for use by a UV sensor. The programmable controller may also store a programmable sensitivity offset, and may include a control circuit configured to control the excitation voltage generator based at least in part on the programmable sensitivity offset to produce an excitation voltage that produces a desired UV sensitivity for the UV sensor. In some cases, the programmable controller may be configured to automatically change the programmable sensitivity offset over the lifetime of the UV sensor.

Alternatively or additionally to any of the embodiments above, the programmable controller may further comprise a timer for tracking an elapsed time, a memory for storing a relationship between a programmable sensitivity offset variable and an elapsed time variable, and the programmable controller may be configured to reference the relationship stored in the memory with the elapsed time provided by the timer to identify the programmable sensitivity offset for use by the control circuit in controlling the excitation voltage produced by the excitation voltage generator.

Alternatively or additionally to any of the embodiments above, the programmable controller may further comprise a temperature sensor for tracking a temperature over time, the memory stores a relationship between the programmable sensitivity offset variable, the elapsed time variable and a temperature over time variable, and the programmable controller may be configured to reference the relationship stored in the memory with the elapsed time provided by the timer and the temperature provided by the temperature sensor to identify the programmable sensitivity offset for use by the control circuit in controlling the excitation voltage produced by the excitation voltage generator.

Alternatively or additionally to any of the embodiments above, the relationship between the programmable sensitivity setting offset and the elapsed time variable may be tailored to a particular UV sensor.

In another embodiment, a method of operating an ultraviolet (UV) sensor may include storing a programmable sensitivity offset that is tailored to a UV sensor, adjusting the excitation voltage provided to the UV sensor based at least in part on the stored programmable sensitivity offset to produce an excitation voltage that results in a desired UV sensitivity for the UV sensor, and operate the UV sensor using the adjusted excitation voltage.

Alternatively or additionally to any of the embodiments above, the programmable sensitivity offset may be stored at a time of original manufacture of the UV sensor.

Alternatively or additionally to any of the embodiments above, the programmable sensitivity offset may be stored at a time of commissioning of the UV sensor.

Alternatively or additionally to any of the embodiments above, a relationship between the programmable sensitivity offset and time may be stored, and wherein the excitation voltage provided to the UV sensor is adjusted over the lifetime of the UV sensor based at least in part on the relationship between the programmable sensitivity setting and time.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which.

Figure 1:
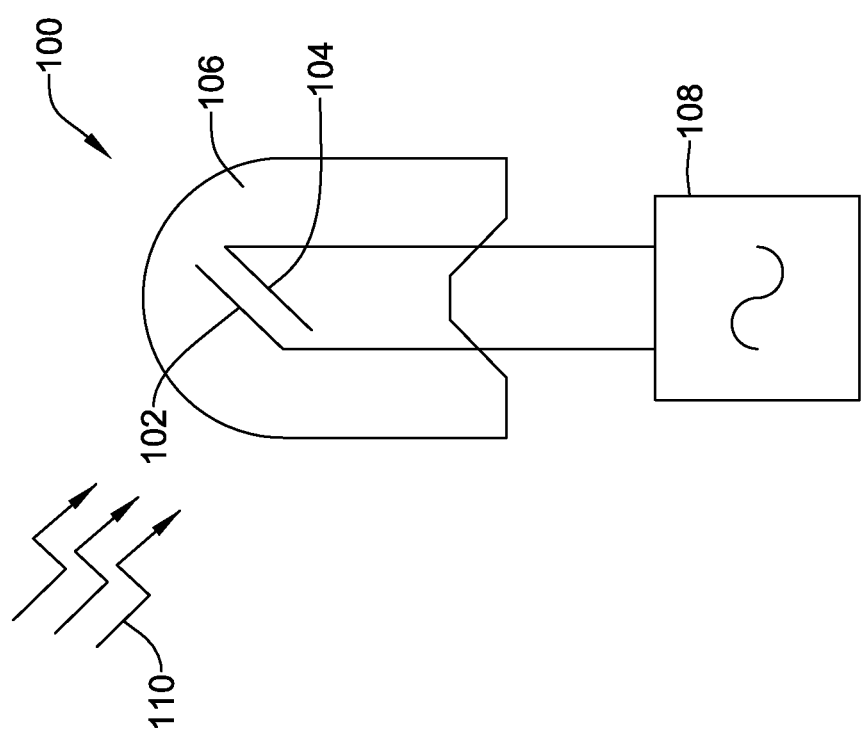
FIG. 1 is a schematic view of an illustrative ultraviolet (UV) sensor.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a system, a method, and/or a non-transitory computer-readable storage medium with an executable program stored thereon for implementing parameter collection operations to obtain critical information regarding actuators used in building control devices. In various embodiments, controller(s) may be configured to direct the operation of actuators included with and/or in building control devices of a building automation system located in or around a building. In this regard, a user may be provided the insight into the overall performance of specific actuators and descriptions of the status of the actuators used in conjunction with the building control devices. This disclosure describes systems, methods, and executable programs that allow an actuator to more easily discover, organize, and diagnose its overall operating status.

Fuel burners such as those found in water heaters, furnaces, boilers, etc. must have some sort of flame sensor for safe operation. The danger resulting from fuel flowing into a combustion space without presence of a flame to burn the fuel is well known. Fuel burners may, therefore, utilize a flame sensor in a fuel valve control to enable opening of a fuel valve in the presence of a flame or conversely, to close the fuel valve in the absence of a flame. Combustion of hydrocarbon fuels produce flames that emit ultraviolet (UV) radiation (e.g., radiation roughly between 10 nm and 400 nm). As such, in some cases, the fuel sensor may be a UV sensor.

FIG. 1 is a schematic view of an illustrative ultraviolet (UV) sensor 100. In some cases, the UV sensor 100 may be a gas discharge tube type UV sensor. The UV sensor 100 may include a pair of electrodes, including a cathode 102 and an anode 104, and a gas filled chamber 106. The cathode 102 and the anode 104 of the UV sensor 100 may be driven by an excitation voltage provided by an excitation voltage generator 108. In some cases, the excitation voltage generator 108 may charge the cathode 102 and the anode 104 to an excitation voltage. The excitation voltage may be, for example, between 0 and 12 volts DC, between 2 and 6 volts DC, between 3 and 5 volts DC, upwards of 100 volts or 300 volts or more, or any other suitable voltage.

When UV rays 110, such as those emitted by a flame of a burner of a combustion appliance, are transmitted through the gas filled chamber 106, the incident energy can cause emission of surface electrons from the cathode 102 into the gas. The electrons are then accelerated by the electric field between the negatively charged cathode 102 to the positively charged anode 104. These electrons collide with molecules of the gas, generating both negative electrons and positive ions. The electrons are attracted to the anode 104 and the ions are attracted to the cathode 102, generating secondary avalanche electrons. With sufficient UV rays 110, a gas discharge current may flow between the cathode 102 and the anode 104 (sometimes referred to as a conduction event), which reduces the excitation voltage between the cathode 102 and the anode 104. When the excitation voltage between the cathode 102 and the anode 104 is reduced, a conduction event can be detected and the UV sensor 100 may send a pulse signal. In some cases, the voltage between the electrodes 102 and 104 may be quenched before the excitation voltage is again applied. When more UV rays 110 that are present, the conduction event will tend to occur sooner after the quench than when less UV rays 110 are present. Thus, in some cases, the UV sensor 100 may produce a series of pulse signals, where the frequency of the pulse signals is related to the emission of the UV rays 110 from a flame.

Figure 2:
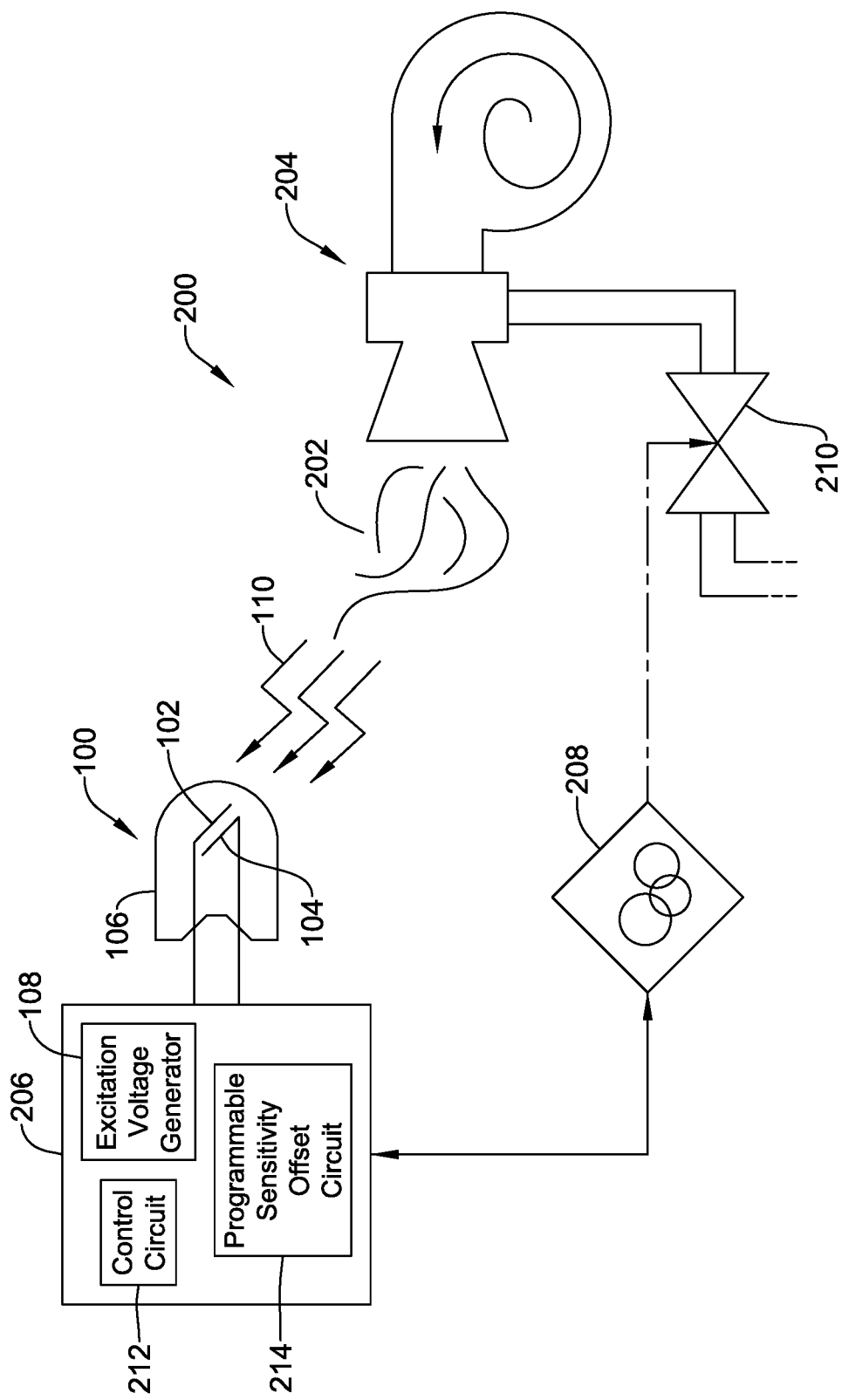
FIG. 2 is a schematic view of an illustrative combustion appliance.

FIG. 2 is a schematic view of an illustrative combustion appliance 200. The combustion appliance includes a UV sensor 100 for monitoring the presence of a flame 202 of a burner 204. The combustion appliance 200 may include the UV sensor 100, the burner 204, a programmable controller 206, a burner management system 208, and a gas valve 210. In some embodiments, the burner 204 can be a fuel-air or fuel-oxygen burner to produce (e.g. generate) the flame 202. For example, burner 204 can be used to produce flame 202, which is used to generate heat for use in residential and/or commercial furnaces, hot water boilers, water heaters, and/or any other suitable application.

In some cases, the programmable controller 206 may be operatively coupled to the UV sensor 100. The programmable controller 206 may include an excitation voltage generator 108, a control circuit 212, and a programmable sensitivity offset circuit 214. In operation, an excitation voltage may be applied between the cathode 102 and the anode 104 by the excitation voltage generator 108. The UV sensor 100 may be positioned to be exposed to the UV rays 110 emitted by the flame 202. Similar to FIG. 1, the UV rays 110 may eventually cause a gas discharge current (i.e. conduction event) to flow between the cathode 102 and the anode 104. After a conduction event, the excitation voltage generator 108 may have to refresh the excitation voltage provided to the UV sensor 100, sometimes following a quench, to compensate for any reduction in voltage caused by the conduction event. In some cases, the UV sensor 100 may send a pulse signal to the control circuit 212 in response to a detected conduction event. In other cases, the control circuit 212 may include detection circuitry capable of detecting a conduction event of the UV sensor 100.

The programmable sensitivity offset circuit 214 may be programmed with a UV sensitivity offset. In some cases, the programmable sensitivity offset circuit 214 may provide a programmable sensitivity offset to the control circuit 212, which may use the programmable sensitivity offset to control the excitation voltage provided by the excitation voltage generator 108 to the UV sensor 100 such that the UV sensor 100 operates at a desired UV sensitivity. The programmable sensitivity offset may be set for the UV sensor 100 at the factory, set during commissioning of the UV sensor 100 in the field, and/or automatically altered over time to help compensate for a degradation in sensitivity of the UV sensor 100. Once the control circuit 212 receives the programmable sensitivity offset from the programmable sensitivity offset circuit 214, the control circuit 212 may determine, based on the sensitivity offset, that the excitation voltage needs to be raised (or lowered) so that the UV sensor 100 operates at a desired UV sensitivity.

In some cases, gas valve 210 can be opened to supply gas to the burner 204 during a call for heat. However, during a call for heat, if the programmable controller 206 indicates to the burner management system 208 that the UV sensor 100 does not detect the presence of flame 202, the burner management system 208 may turn off the gas valve 210 to help prevent the buildup of unburnt fuel in the burner 204. In some cases, if the health of the UV sensor 100 is determined to be unacceptable by the programmable controller 206, the burner management system 208 may also turn off the gas valve 210 and extinguish any flame 202 until the UV sensor 100 can be serviced. In some cases, the burner management system 208 can control various aspects of the operation of burner 204, including initial ignition of the burner 204 in response to a call for heat, and the termination of the burner at the end of the call for heat. In some cases the burner management system 208 may change the firing rate of the burner 204 to produce a more intense flame 202 or a less intense flame 202.

Figure 3:
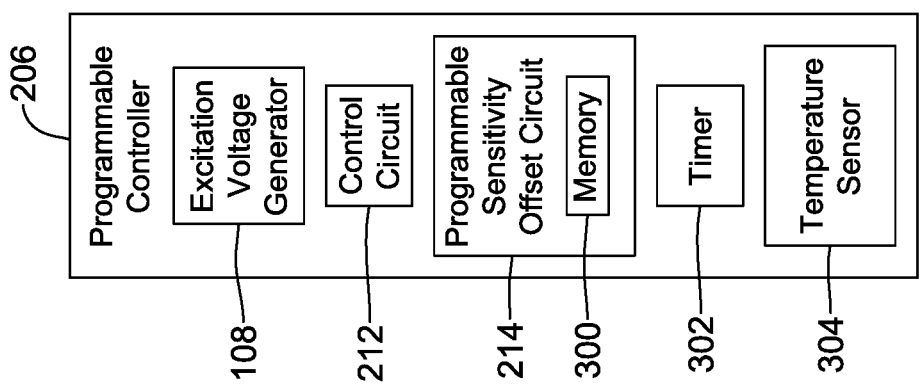
FIG. 3 is a schematic block diagram of an illustrative programmable controller.

FIG. 3 is a schematic block diagram of an illustrative programmable controller 206. In some instances, the programmable controller 206 may include an excitation voltage generator 108, a control circuit 212, a programmable sensitivity offset circuit 214, a timer 302, a temperature sensor 304, and/or any other suitable component as desired. As discussed above, the programmable controller 206 may be coupled to and control a UV sensor (e.g., UV sensor 100). The excitation voltage generator 108 may apply an excitation voltage to the UV sensor in order to detect UV rays emitted by a flame (e.g., flame 202) of a combustion appliance. The UV sensor 100 may have a UV sensitivity that reflects the amount of UV rays needed for the UV sensor 100 to detect a given UV emission (e.g. incident UV rays required to trigger a conduction event). The UV sensitivity of a particular UV sensor 100 may be dependent on many factors including, for example, impurities in the electrodes of the UV sensor, corrosion of the electrodes, the leakage of gas from the gas filled chamber of the UV sensor, the amount of time the UV sensor has been in operation, the cumulative number of conduction events experienced by the UV sensor, the operating temperature experienced by the UV sensor, the number and/or severity of voltage and/or current spikes experienced by the UV sensor, and/or other factors.

Figure 4:
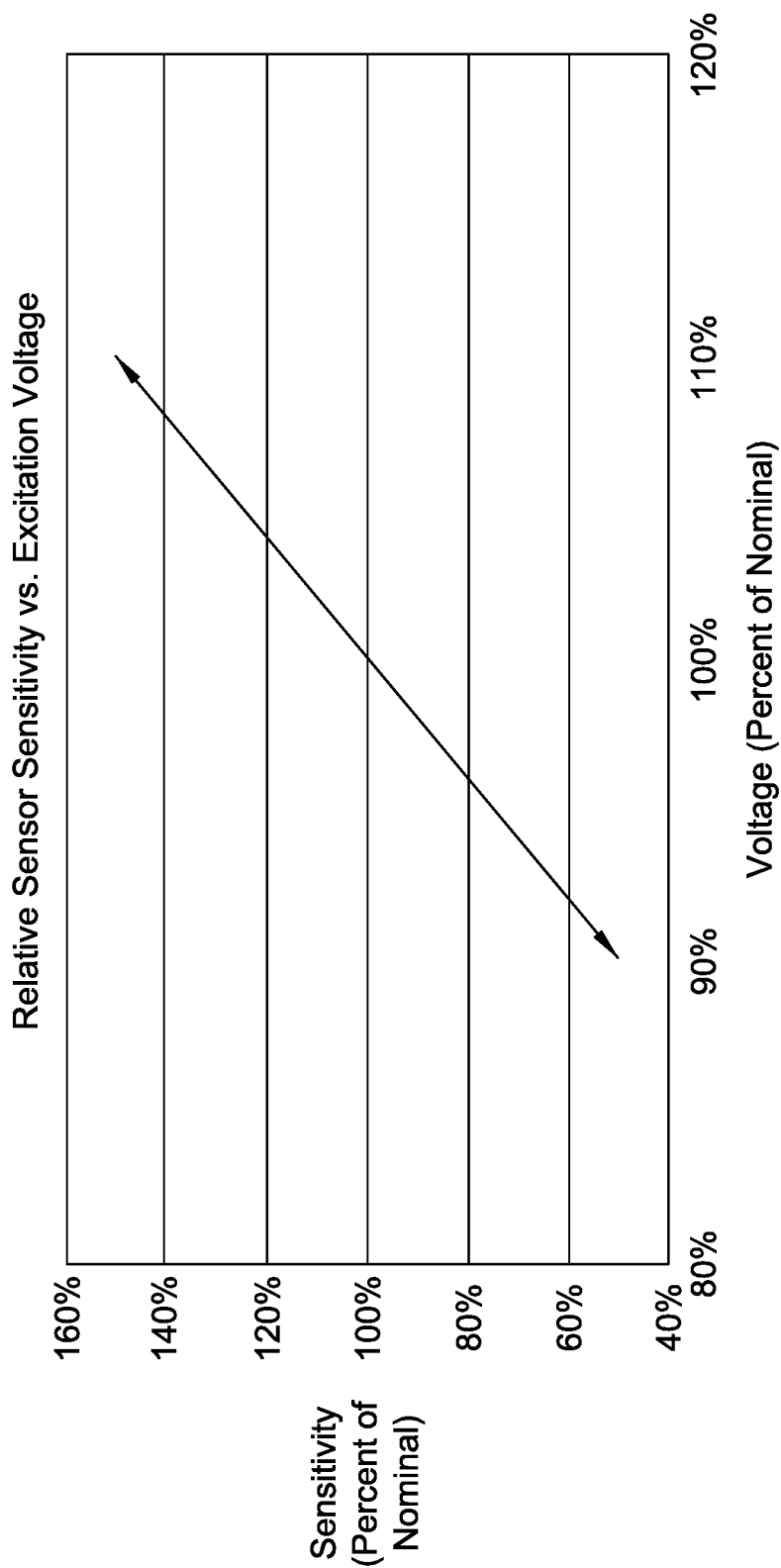
FIG. 4 is a graph showing an illustrative relationship between relative sensor sensitivity and excitation voltage for an example UV sensor.

FIG. 4 is a graph showing an illustrative relationship between relative sensor sensitivity and excitation voltage for an example UV sensor. As can be seen, the UV sensitivity of a UV sensor can be highly dependent on the applied excitation voltage. For example, as shown in FIG. 4, increasing the excitation voltage by 10% (e.g. from 90% to 100) may increase the sensitivity of the UV sensor by roughly 45% (e.g. from 55% to 100%) Likewise, decreasing the excitation voltage by 10% may decrease the sensitivity of the UV sensor by a similar amount. While a linear relationship is shown in FIG. 4, it should be understood that the relationship between excitation voltage and sensitivity may be non-linear. Also, relationships may exist between temperature and sensitivity, time and sensitivity, cumulative number of conduction events experienced by the UV sensor and sensitivity, operating temperature experienced by the UV sensor and sensitivity, cumulative number and/or severity of voltage and/or current spikes experienced by the UV sensor and sensitivity, and other relationships. In some cases, a multi-variable relationship may be derived and stored between UV sensor sensitivity (e.g. sensitivity offset) and multiple different variables. As such, in some cases, given the numerous factors that can affect the UV sensitivity of the UV sensor, the programmable controller 206 may be configured to control the excitation voltage applied to the UV sensor such that the UV sensor operates with a desired UV sensitivity (e.g. constant UV sensitivity over time, temperature, etc.).

Turning back to FIG. 3, in some cases, the programmable sensitivity offset circuit 214 may include a memory 300. The memory 300 can be any type of storage medium that can be accessed by the programmable sensitivity offset circuit 214 to perform various examples of the present disclosure. For example, the memory 300 can be a non-transitory computer readable medium having computer readable instructions (e.g., computer program instructions) stored thereon that are executable by the programmable sensitivity offset circuit 214 and/or control circuit 212. The memory 300 can be volatile or nonvolatile memory. The memory 300 can be removable (e.g., portable) memory, or non-removable (e.g., internal) memory. The memory 300 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory. Further, although memory 300 is illustrated as being located within the programmable sensitivity offset circuit 214, embodiments of the present disclosure are not so limited. For example, memory 300 can be located internal to another computing resource (e.g., enabling computer readable instructions to be downloaded over the Internet or another wired or wireless connection).

In some cases, a UV sensitivity offset may be programmed and stored in memory 300 during manufacture of the UV sensor. In some cases, the UV sensitivity offset of the UV sensor may be programmed when the UV sensor is commissioned or installed with a burner (e.g., burner 204) in the field. For example, the UV sensor may be compared to a standard UV sensor having a factory calibrated UV sensitivity, and the sensitivity may be adjusted to match the sensitivity of the standard UV sensor. In some cases, the UV sensitivity offset may be automatically altered over time by the programmable sensitivity offset circuit 214 to help compensate for a degradation in sensitivity of the UV sensor 100.

In some cases, the memory 300 may store a UV sensitivity forecast model. The UV sensitivity forecast model may be supplied with variables such as, operational time, operational temperature, environmental temperature, other operating and atmospheric conditions, operational degeneration due to common damages to UV sensors, such as gas leakage from the gas filled chamber and/or other variables. The programmable sensitivity offset circuit 214 may supply the variable to the UV sensitivity forecast model to determine a UV sensitivity offset. The UV sensitivity offset may then be supplied to the control circuit, which may then determine, based on the UV sensitivity offset, an appropriate excitation voltage so that the UV sensor 100 operates at a desired UV sensitivity.

During operation, when the UV sensor is exposed to a flame from a burner, the programmable sensitivity offset circuit 214 may provide a UV sensitivity offset to the control circuit 212, and the control circuit 212 may control the excitation voltage generator 108 to produce an excitation voltage that results in a desired UV sensitivity for the UV sensor. In some cases, programmable sensitivity offset circuit 214 may reference a relationship between a UV sensitivity offset and elapsed time. When so provided, the programmable sensitivity offset circuit 214 may use the timer 302 to identify the time that has elapsed since the UV sensor was commissioned, began operation, was installed, etc. The programmable sensitivity offset circuit 214 may then reference the relationship between UV sensitivity offset and elapsed time stored in the memory 300 and use the identified elapsed time to look-up the corresponding UV sensitivity offset for the UV sensor at that given time. Once the UV sensitivity offset has been identified, the control circuit 212 can process the UV sensitivity offset to determine an excitation voltage that must be applied to achieve the desired UV sensitivity. The control circuit 212 may use the excitation voltage generator 108 to apply the determined excitation voltage to the UV sensor.

In some cases, the control circuit 212 may reference a relationship between UV sensitivity offset and a temperature over time. In some cases, the memory 300 of the programmable sensitivity offset circuit 214 may store a record of the temperature over time. For example, the control circuit 212 may use the timer 302 and the temperature sensor 304 to identify the environmental temperature in which the UV sensor is operating over time. In some cases, the control circuit 212 may store a record of the temperature over time in the memory 300. This may include, for example, a histogram of the number of seconds the UV sensor has experienced each temperature between 40 degrees F. and 220 degrees F. or between 60 degrees F. and 500 degrees F. or more. The programmable sensitivity offset circuit 214 may then access the record and identify a similar/closest temperature over time scenario to look-up a corresponding UV sensitivity offset for the UV sensor at that given time. Once the UV sensitivity offset has been identified, the control circuit 212 can process the sensitivity offset to determine the excitation voltage that must be applied to achieve the desired UV sensitivity. The control circuit 212 may then use the excitation voltage generator 108 to apply the determined excitation voltage to the UV sensor.

In some cases, the control circuit 212 may reference a relationship between UV sensitivity offset and multi-variables. In some cases, the memory 300 may store a record of the multi-variables. For example, similar to the example described above, the programmable sensitivity offset circuit 214 may use the timer 302, the temperature sensor 304 and/or other sensors or conditions to identify an appropriate UV sensitivity offset given the current multi-variable conditions. Once the UV sensitivity offset has been identified, the control circuit 212 can process the sensitivity offset to determine the excitation voltage that must be applied to achieve the desired UV sensitivity. The control circuit 212 may then use the excitation voltage generator 108 to apply the determined excitation voltage to the UV sensor.

In some cases, the control circuit 212 may be configured to automatically change the programmable sensitivity offset over the lifetime of the UV sensor. For example, the programmable controller 206 may monitor the number of pulse signals received from the UV sensor over time. In some instances, when the UV sensor is operating at a determined excitation voltage, the programmable controller 206 may expect to receive a certain number of pulse signals. In some case, the programmable controller 206 may determine that the number of pulse signals received is below an expected amount, particularly when it is known that the flame of the burner is firing hot (perhaps confirmed by a technician or a photodetector or the like). In response, the programmable controller 206 may identify that the UV sensor is not operating with the desired UV sensitivity. Accordingly, the programmable sensitivity offset circuit 214 may change the UV sensitivity offset and store the new UV sensitivity offset in memory 300. The control circuit 212 may then use the new UV sensitivity offset to determine the excitation voltage that must be applied to achieve the desired UV sensitivity.

In some cases, the programmable controller 206 may also be used to control the operation of a burner (e.g., burner 204). For example, as stated above, the programmable controller 206 may monitor the number of pulse signals received from the UV sensor over time. If the programmable controller 206 determines that the number of pulses received is below an expected amount, the programmable controller 206 may determine that either the health of the UV sensor is unacceptable (e.g., the UV sensor is broken or is non-operational) or the flame that emits the UV rays is low or extinguished. Accordingly, the programmable controller 206 may provide instructions to the burner management system (e.g., burner management system 208) to turn off the flow of fuel into the burner, and either extinguish the flame or prevent the buildup of unburnt fuel in the burner if the flame is already extinguished.

Figure 5:
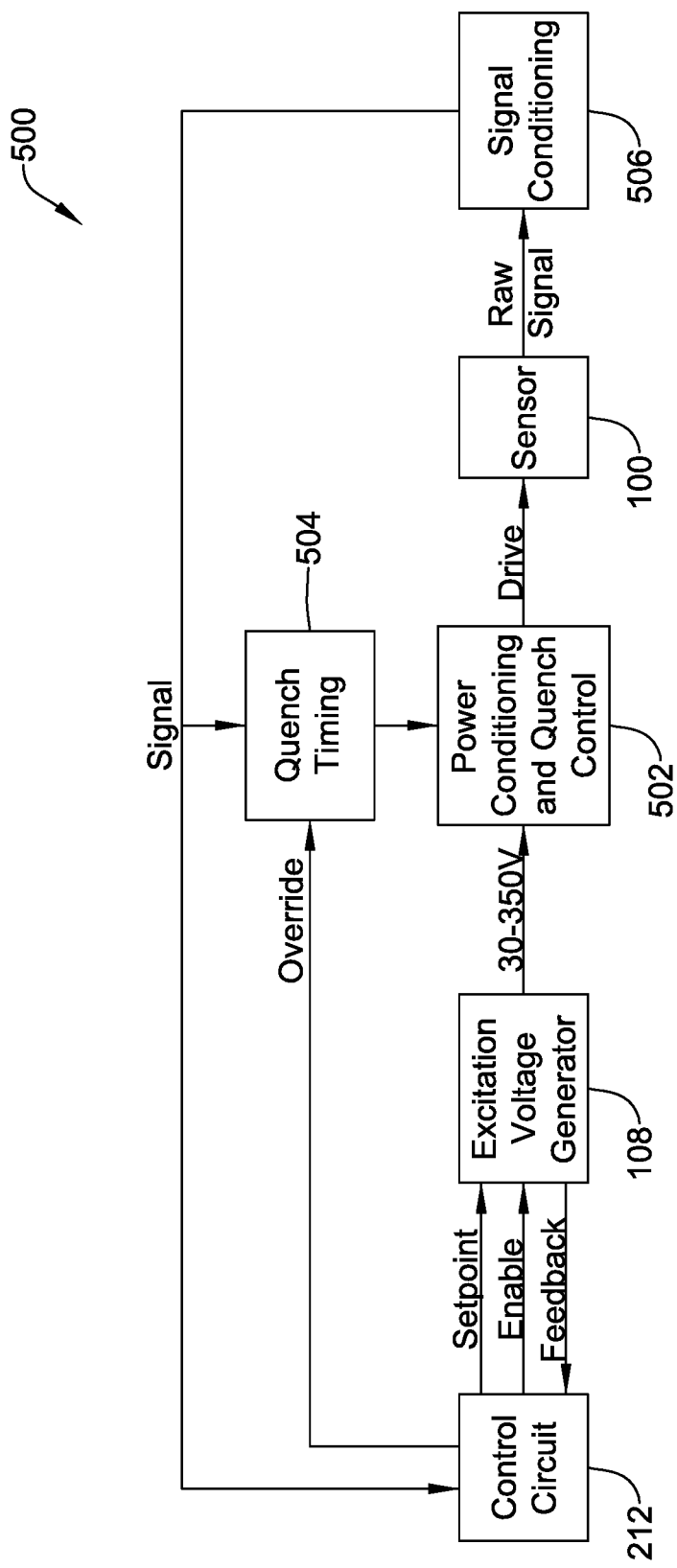
FIG. 5 is a flow chart showing an illustrative method of operating an UV sensor.

FIG. 5 is a flow chart showing an illustrative method 500 of operating an UV sensor. In some cases, the control circuit 212 may send an excitation voltage setpoint and enablement to the excitation voltage generator 108. In addition, the excitation voltage generator 108 may provide feedback to the control circuit 212 signaling reception of the excitation voltage setpoint and enablement. In some cases, the excitation voltage setpoint may have a range of 0 and 12 volts DC, 2 and 6 volts DC, 3 and 5 volts DC, or any other suitable voltage.

In some cases, the excitation voltage generator 108 may apply the excitation voltage to a power conditioning and quench control module 502, as shown. The quench timing module 504 may identify the timing of each conductive event of the UV sensor and send the timing to the power conditioning and quench control module 502. In some cases, the power conditioning and quench control module 502 may temporarily short the electrodes of the UV sensor 100 together to refresh the UV sensor 100 (quench the UV sensor 100) before re-applying the excitation voltage.

In some cases, when the UV sensor 100 experiences a conduction event, a raw signal may be sent to a signal conditioning module 506, which may process the raw signal and send a pulse signal to the programmable controller 206 and the quench timing module 504. In some cases, the programmable controller 206 may monitor the number of pulse signals received over time. The frequency of the pulse signals may represent the intensity of the UV rays at the UV sensor 100. In some instances, the programmable controller 206 may expect to receive a certain amount of pulse signals in a given time when the flame is burning hot. In some cases, the programmable controller 206 may determine that the number of pulse signals received is below the expected amount. In some cases, the programmable controller 206 may identify that the UV sensor is not operating with the desired UV sensitivity. Accordingly, the programmable controller 206 may change the excitation voltage setpoint to increase the UV sensitivity. The programmable controller 206 may then expect that the frequency of the conduction events to increase, and thus the excitation voltage may need to be refreshed more frequently. Therefore, and in some cases, the programmable controller 206 may send a timing signal to the quench timing module 504 that overrides the timing identified by the quench timing module 504. The power conditioning and quench control module 502 may then utilize the override timing and the new excitation voltage to coordinate the quench and the application of the new excitation voltage at the appropriate times.

Figure 6:
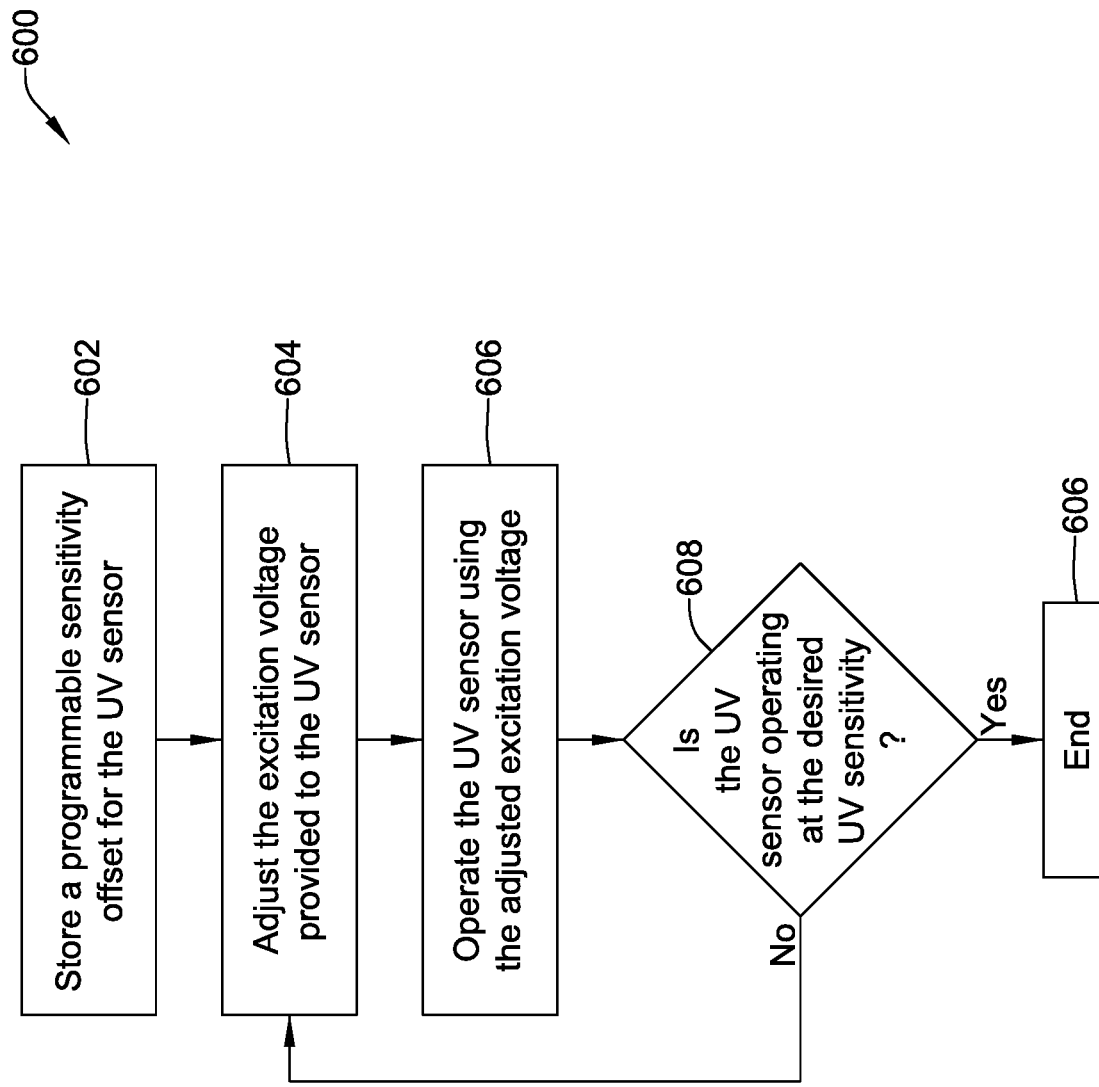
FIG. 6 is a flow chart showing another illustrative method of operating an UV sensor.

FIG. 6 is a flow chart showing another illustrative method 600 of operating an UV sensor. At step 602, a sensitivity offset may be stored for the UV sensor. In some examples, a programmable controller may be used and the sensitivity offset may be programmed and stored in the programmable controller. In some examples, the programmable sensitivity offset may be stored on the programmable controller when the UV sensor is manufactured. In some examples, the programmable sensitivity offset may be stored on the programmable controller when the UV sensor is commissioned out in the field. In some examples, the sensitivity offset may be unique and tailored specifically for a particular UV sensor. In some examples, the sensitivity offset may be automatically changed over the lifetime of the UV sensor.

At step 604, the excitation voltage provided to the UV sensor may be adjusted based at least in part on the stored programmable sensitivity offset to produce an excitation voltage that results in a desired UV sensitivity for the UV sensor. In some examples, the excitation voltage may be dependent upon the amount of time that has elapsed, and the excitation voltage may be adjusted over the lifetime of the UV sensor. In some cases, the programmable controller may reference a stored relationship between the programmable sensitivity offset and elapsed time. In some examples, the programmable controller may identify the time that has elapsed since the UV sensor was commissioned, began operation, was installed, etc. The programmable controller may then access the stored relationship and use the identified elapsed time to look-up the sensitivity offset for the UV sensor at that given time. Once the sensitivity offset has been identified, the programmable controller can use the sensitivity offset to determine an adjusted excitation voltage that must be applied to achieve the desired UV sensitivity. At step 606, the adjusted excitation voltage may be used to operate the particular UV sensor.

At step 608, it may be determined whether the particular UV sensor is operating at the desired UV sensitivity. In some examples, the programmable controller may monitor the particular UV sensor. If the programmable controller determines that the particular UV sensor is operating at the desired UV sensitivity, method 600 may end. However, if the programmable controller determines that the particular UV sensor is not operating at the desired UV sensitivity, the programmable controller may change the programmable sensitivity offset and determine the excitation voltage that must be applied to achieve the desired UV sensitivity. At step 604, the excitation voltage provided to the particular UV sensor may once again be adjusted based at least in part on the new programmable sensitivity offset to produce an excitation voltage that results in the desired UV sensitivity for the particular UV sensor, and method 600 may proceed in a similar fashion until the particular UV sensor is operating at the desired UV sensitivity.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations.

What is claimed is:

1. A programmable controller for controlling an ultraviolet (UV) sensor for use in a combustion appliance that is excited by an excitation voltage, wherein a UV sensitivity of the UV sensor is dependent on the excitation voltage, the programmable controller comprising:
    an excitation voltage generator configured to produce an adjustable excitation voltage for use by the UV sensor;
    a temperature sensor for sensing an environmental temperature in which the UV sensor is operating over time;
    a programmable sensitivity offset circuit for use in controlling the UV sensitivity of the UV sensor, the programmable sensitivity offset circuit operatively coupled to the temperature sensor and providing a programmable sensitivity offset for the UV sensor based at least in part on the environmental temperature sensed by the temperature sensor over time;
    a control circuit operatively coupled to the excitation voltage generator and the programmable sensitivity offset circuit, the control circuit configured to control the excitation voltage generator based at least in part on the programmable sensitivity offset provided by the programmable sensitivity offset circuit to produce an excitation voltage that results in a desired UV sensitivity for the UV sensor.

2. The programmable controller of claim 1, wherein the programmable sensitivity offset circuit is configured to automatically change the programmable sensitivity offset over the lifetime of the UV sensor.

3. The programmable controller of claim 1, wherein the programmable sensitivity offset is programmed at a time of original manufacturer of the UV sensor.

4. The programmable controller of claim 1, wherein the programmable sensitivity offset is programmed at a time of commissioning of the UV sensor.

5. The programmable controller of claim 1, wherein the programmable sensitivity offset circuit is tailored to a particular UV sensor.

6. The programmable controller of claim 5, further comprising:
    a timer for tracking an elapsed time;
    the memory stores a relationship between a programmable sensitivity offset variable and an elapsed time variable; and
    wherein the programmable sensitivity offset circuit is configured to reference the relationship stored in the memory with the elapsed time provided by the timer to identify the programmable sensitivity offset for use in controlling the excitation voltage produced by the excitation voltage generator.

7. The programmable controller of claim 6, wherein
    the memory stores a relationship between the programmable sensitivity offset variable, the elapsed time variable and a temperature over time variable; and
    wherein the programmable sensitivity offset circuit is configured to reference the relationship stored in the memory with the elapsed time provided by the timer and the environmental temperature sensed by the temperature sensor over time to identify the programmable sensitivity offset for use in controlling the excitation voltage produced by the excitation voltage generator.

8. The programmable controller of claim 5, wherein the memory stores a multi-variable relationship between one or more condition variables and a programmable sensitivity offset variable, wherein the one or more condition variables include an environmental temperature variable; and
    wherein the programmable sensitivity offset circuit is configured to reference the multi-variable relationship stored in the memory with one or more of the condition variables to identify the programmable sensitivity offset for use in controlling the excitation voltage produced by the excitation voltage generator.

9. The programmable controller of claim 8, wherein the one or more condition variables comprise an elapsed time variable.

10. The programmable controller of claim 8, wherein the one or more condition variables comprise an over-voltage variable.

11. The programmable controller of claim 8, wherein the one or more condition variables comprise a cumulative number of conduction events of the UV sensor.

12. A programmable controller for controlling an ultraviolet (UV) sensor for use in a combustion appliance that is excited by an excitation voltage, wherein a UV sensitivity of a UV sensor is dependent on the excitation voltage, the programmable controller comprising:
  an excitation voltage generator configured to produce an adjustable excitation voltage for use by the UV sensor;
  a temperature sensor for sensing an environmental temperature in which the UV sensor is operating over time;
  a programmable sensitivity offset circuit operatively coupled to the temperature sensor for providing a programmable sensitivity offset for the UV sensor based at least in part on the environmental temperature sensed by the temperature sensor over time;
  a control circuit operatively coupled to the programmable sensitivity offset circuit and configured to control the excitation voltage generator based at least in part on the programmable sensitivity offset to produce an excitation voltage that produces a desired UV sensitivity for the UV sensor; and
  wherein the programmable controller is configured to automatically change the programmable sensitivity offset over the lifetime of the UV sensor.

13. The programmable controller of claim 12, further comprising:
  a timer for tracking an elapsed time;
  a memory for storing a relationship between a programmable sensitivity offset variable and an elapsed time variable; and
  wherein the programmable controller is configured to reference the relationship stored in the memory with the elapsed time provided by the timer to identify the programmable sensitivity offset for use by the control circuit in controlling the excitation voltage produced by the excitation voltage generator.

14. The programmable controller of claim 13, wherein
  the memory stores a relationship between the programmable sensitivity offset variable, the elapsed time variable and a temperature over time variable; and
  wherein the programmable controller is configured to reference the relationship stored in the memory with the elapsed time provided by the timer and the environmental temperature sensed by the temperature sensor to identify the programmable sensitivity offset for use by the control circuit in controlling the excitation voltage produced by the excitation voltage generator.

15. The programmable controller of claim 13, wherein the relationship between the programmable sensitivity offset and the elapsed time variable is tailored to a particular UV sensor.

* * * * *